United States Patent
Rao

(10) Patent No.: US 6,504,785 B1
(45) Date of Patent: Jan. 7, 2003

(54) MULTIPROCESSOR SYSTEM WITH INTEGRATED MEMORY

(75) Inventor: G. R. Mohan Rao, Dallas, TX (US)

(73) Assignee: Silicon Aquarius, Inc.

(*) Notice: Subject to any disclaimer, the term of this patent is extended or adjusted under 35 U.S.C. 154(b) by 147 days.

(21) Appl. No.: 09/542,955

(22) Filed: Jul. 27, 2000

Related U.S. Application Data

(62) Division of application No. 09/026,927, filed on Feb. 20, 1998, now Pat. No. 6,173,356.

(51) Int. Cl.⁷ ................................................ G11C 8/00
(52) U.S. Cl. ............................. 365/230.05; 365/230.08; 365/189.05; 365/189.07
(58) Field of Search ....................... 365/230.05, 230.08, 365/189.05, 189.07

(56) References Cited

U.S. PATENT DOCUMENTS

| | | | | |
|---|---|---|---|---|
| 5,829,027 A | * | 10/1998 | Goodrum | 365/230.03 |
| 5,835,932 A | * | 11/1998 | Rao | 365/230.03 |
| 5,890,195 A | * | 3/1999 | Rao | 711/104 |
| 6,173,356 B1 | * | 1/2001 | Rao | 711/104 |
| 6,191,996 B1 | * | 2/2001 | Yamamoto | 365/230.03 |
| 6,229,752 B1 | * | 5/2001 | Ayukawa et al. | 365/230.01 |

* cited by examiner

Primary Examiner—Vu A. Le
Assistant Examiner—Tuan T. Nguyen
(74) Attorney, Agent, or Firm—James J. Murphy, Esq.; Winstead Sechrest & Minick, P.C.

(57) ABSTRACT

A multiprocessor processing 200 includes a memory system having a memory controller 202 for linking a plurality of processors 201 with an integrated memory 203. Integrated memory 203 comprises a plurality of static random access arrays 603 and a dynamic random access 407.

21 Claims, 8 Drawing Sheets

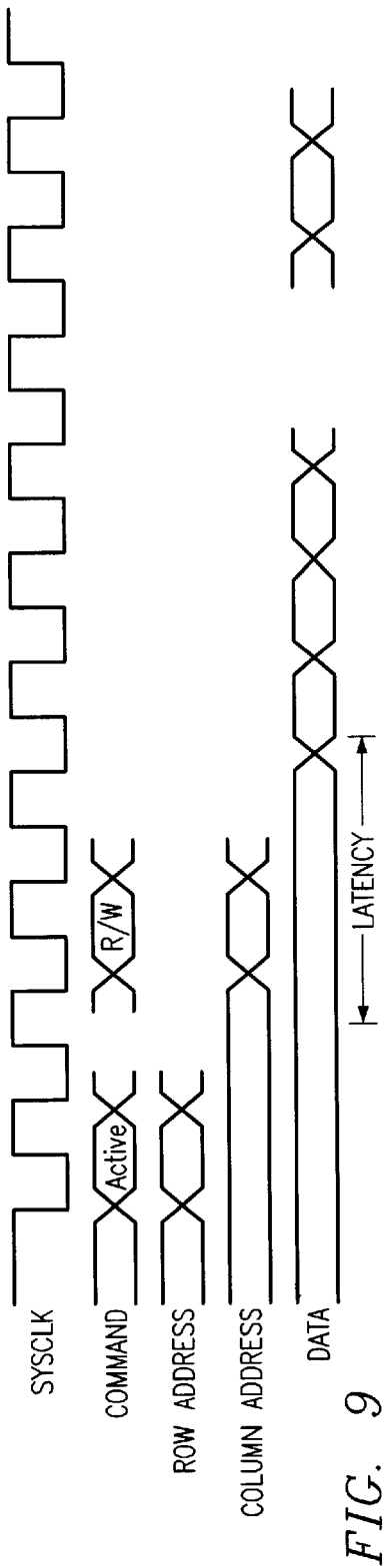
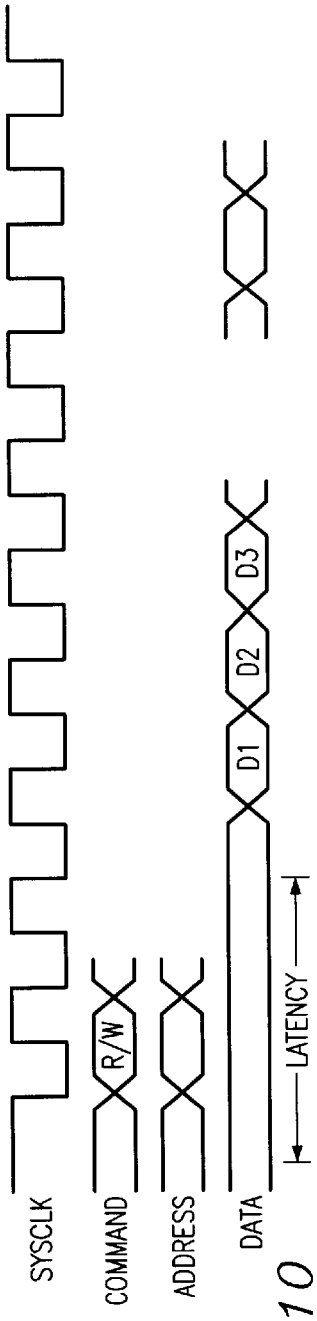
FIG. 8
FIG. 9
FIG. 10

MULTIPROCESSOR SYSTEM WITH INTEGRATED MEMORY

CROSS-REFERENCE TO RELATED APPLICATIONS

The present invention is related to DRAM WITH INTEGRAL SRAM, U.S. Pat. No. 5,835,932, issued Nov. 10, 1998; filed on Mar. 13, 1997, and U.S. Pat. No. 5,890,195 issued Mar. 30, 1999; and This application is a Divisional Application of application Ser. No. 09/026,927, entitled "MULTI-PORT DRAM WITH INTEGRATED SRAM AND SYSTEMS AND METHODS USING THE SAME", filed Feb. 20, 1998, now U.S. Pat. No. 6,173,356 issued Jan. 1, 2001, filed on May 14, 1997.

TECHNICAL FIELD OF THE INVENTION

The present invention relates in general to electronic memories and in particular to a dynamic random access memory (DRAM) with integral static random access memory (SRAM), and systems and methods using the same.

BACKGROUND OF THE INVENTION

Currently available dynamic random access memories (DRAMs) are generally based upon architectures which share the following characteristics. First, the typical general purpose DRAM has a single data port for writing and reading data to and from addressed storage locations ("dual ported" DRAMs are available which provide two data ports, typically one random and one serial port, however, these devices are normally limited to special memory applications). Second, data writes and reads are only made on a location by location basis, with each location typically being one bit, one byte or one word wide. Specifically, in a "random access mode", an access (read or write) is made to a single location per row address strobe (/RAS) active cycle and in a "page mode" an access is made to a single location per column address strobe (/CAS) or master clock cycle of the row addressed during the given /RAS cycle. Alternatively, in synchronous DRAM, a memory access cycle is initiated by asserting an active command in the DRAM, during which row addresses are latched on the rising edge of a master clock. A read/write command causes column addresses to be latched on the rising edge of the master clock following which, after a latency period expires, data is clocked out with each rising edge on the master clock. Third, no method has generally been established to handle contention problems which arise when simultaneous requests for access are made to the same DRAM unit. Current techniques for handling contention problems depend on the DRAM and/or system architecture selected by the designer and range, for example, from "uniform memory-noncontention" methods to "non-uniform memory access" (NUMA) methods.

Similarly, the system architectures of personal computers (PCs) generally share a number of common features. For example, the vast majority of today's PCs are built around a single central processing unit (CPU), which is the system "master." All other subsystems, such as the display controller, disk drive controller, and audio controller then operate as slaves to the CPU. This master/slave organization is normally used no matter whether the CPU is a complex instruction set computer (CISC), reduced instruction set computer (RISC), Silicon Graphics MIPS device or Digital Equipment ALPHA device.

Present memory and PC architectures, such as those discussed above, are rapidly becoming inadequate for constructing the fast machines with substantial storage capacity required to run increasingly sophisticated application software. The problem has already been addressed, at least in part, in the mainframe and server environments by the use of multiprocessor (multiprocessing) architectures. Multiprocessing architectures however are not yet cost effective for application in the PC environment. Furthermore, memory contention and bus contention are still significant concerns in any multiprocessing system, and in particular in a multiprocessing PC environment.

A CPU typically exchanges data with memory in terms of "cache lines." Cache lines are a unit of data by which operandi and results can be stored or retrieved from memory and operated on by the CPU in a coherent fashion. Cache lines accesses are made both to cache and to system memory.

In systems operating with CPUs having a 32-bit data I/O port, a cache line is normally eight (8) 32-bit words or 256 bits. In the foreseeable future, data I/O ports will be 64 bits wide, and cache lines may be comprised of 16 64-bit data words or 1024 bits in length. Typically, the CPU may read a cache line from a corresponding location in memory, perform an arithmetic or logic operation on that data and then write the result back to the same location in system or cache memory. A given location for a cache line can be in one or more physical rows in memory and therefore an access to cache line location may require multiple /RAS cycles. In any event, the CPU, depending on the operating system running, can generally access any location in memory for storing and retrieving operandi and results.

Often situations arise when the results from a given operation exceed the length of the cache line and therefore data can no longer be processed as coherent cache line units. For example, if the CPU performs a n by n bit integer multiplication, the result could be a maximum of 2n bits. In other words, while each operand can be retrieved from memory as a cache line, the result exceeds the length of a single cache line and coherency is lost. Similarly, when operandi containing decimal points or fractions are involved, exceeding the length of a cache line can also take place. In the case of fractions, long strings of bits, which exceed cache line length, may be required to minimize rounding errors and therefore increase the precision of the calculations.

In any computing system, and in particular multiprocessing systems, the ability to operate on data as cache lines substantially improves operating efficiency. Thus, when a cache line is exceeded during an operation, system performance is reduced. Specifically, when a cache line is exceeded, the CPU must either access that data as two cache lines or as a cache line and additional discrete words or doublewords of data. As a result, extra memory cycles are required to execute an operation and the transfer of data within the system is more difficult because the necessary data is no longer in proper cache line data structures. Moreover, performance in multiprocessor systems is impaired when one processor is waiting for a second processor to complete its read or write to memory before being able to read or write its data.

Thus, the need has arisen for new memory and system architectures in which operations can be performed on coherent units of data, even if cache lengths are exceeded. In particular in multiprocessor systems, there is a need for system and memory architectures in which multiple processors can operate on data simultaneously.

SUMMARY OF THE INVENTION

Among the many advantages, the principles of the present invention allow for the efficient accessing of blocks of data as required by the multiple CPU data processing system. For example, in a four bank embodiment, with two registers per bank, a contiguous block of eight rows of data and associated addresses can be stored in register for fast access. Typically, the CPU accesses data within such spatially or temporally contiguous blocks. Thus, when the CPU requires data from memory, and that data is already stored in register, data with a given spatial or temporal locality thereof is also most likely already in a register. In this fashion, the number of "hits" to pre-stored data is substantially increased. The principles of the present invention also allow for high speed accesses directly from the registers, in addition to traditional accesses to the DRAM cell array. The advantages are particularly evident, in a single chip implementation according to the principles of the present invention.

A data port associated with each bank provides for independent access to each bank by the multiple processors. In an embodiment having an address port in each bank, the multiple processors may independently access incongruent memory locations in each bank. That is, memory cells having different relative locations within each bank are accessible, in this embodiment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 is a diagram of the bitfields of the mode register shown in FIG. 4; and

FIG. 9 illustrates a timing diagram for exemplary read/write operations to the memory of FIG. 4

FIG. 10 illustrates an alternative timing diagram for exemplary read/write operations to the memory of FIG. 4.

DETAILED DESCRIPTION OF THE INVENTION

The principles of the present invention and their advantages are best understood by referring to the illustrated embodiment depicted in FIGS. 1–9 of the drawings, in which like numbers designate like parts. In the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state.

Figure 1A:
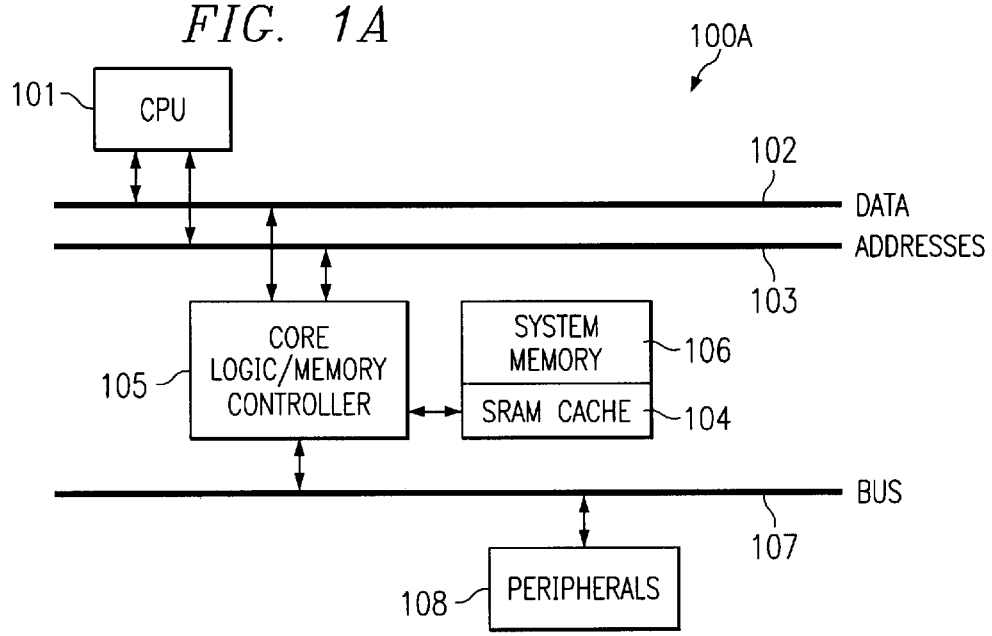
FIG. 1A is a drawing, in block form, of a data processing system including a memory system in accordance with the principles of the present invention.
Figure 1B:
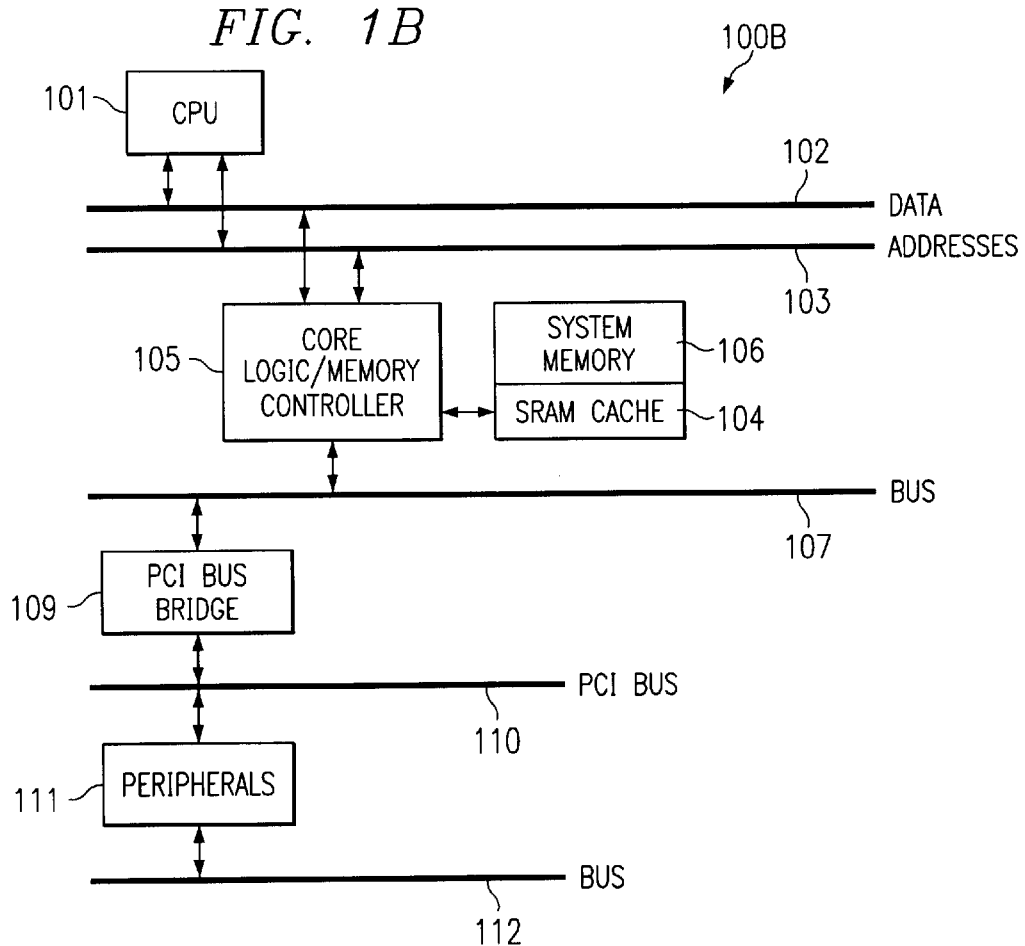
FIG. 1B is a drawing, in block form, of an alternative embodiment of a data processing system including a memory system in accordance with the principles of the present invention.

FIGS. 1A and 1B are block diagrams respectively depicting two basic system architectures 100A and 100B typical of those found in personal computers (PCs). While numerous variations on these basic architectures exist, FIGS. 1A and 1B are suitable for describing the basic structure and operation of most PCs.

Both systems 100A and 100B include a single central processing unit 101, CPU local data bus 102, CPU local address bus 103, external (L2) cache 104, core logic/memory controller 105, and system memory 106. In system 100A, the peripherals 108 are coupled directly to core logic/memory controller 105 via a bus 107. Bus 107 in this case is preferably a peripheral controller interface (PCI) bus, although alternatively it could be an ISA, general, or special purpose bus, as known in the art. In system 100B, core logic/memory controller 105 is again coupled to bus 107. A PCI bus bridge then interfaces bus 107 with a PCI bus 110, to which the peripherals 111 couple. An additional bus 112, which may be a ISA, PCI, VESA, IDE, general, or special purpose bus, is provided for access to peripherals 111 from an external device or system (not shown).

In single CPU systems 100A and 100B, CPU 101 is the "master" which, in combination with the operating system and applications software, controls the overall operation of system 100. Among other things, CPU 101 performs various data processing functions including numerical and word processing, generates graphics data, and performs overall system management. CPU 101 may be, for example, a complex instruction set computer (CISC), such as an Intel Pentium™ class microprocessor, a reduced instruction set computer (RISC), such as a Apple PowerPC microprocessor, or a very long instruction word (VLIW) machine.

CPU 101 communicates with the remainder of system 100 via CPU local address and data buses 102 and 103, each of which may be, for example, a special bus, or a general bus, as known in the art.

Core logic/memory controller 105, under the direction of CPU 101, controls the exchange of data, addresses, control signals and instructions between CPU 101, system memory 106, and peripherals 108/111 via bus 107 and/or PCI bus bridge 109. Although the core logic/memory controller allows tasks to be shifted from the CPU, thereby allowing the CPU to attend to other CPU-intensive tasks, the CPU can always override core logic/memory controller 105 to initiate execution of a higher priority task.

Core logic and memory controllers are widely available in the PC industry and their selection and application well known by those skilled in the art. The memory controller can be either a separate device or incorporated into the same chip set as the core logic. The memory controller is generally responsible for generating the memory clocks and control signals such as /RAS, /CAS, /WE (write enable), /OE (output enable) and bank select, and monitors and controls cell refresh. Alternatively, the memory controller generates the command and clock signals in an embodiment employing the principles of the present invention in which memory 106 may be synchronous DRAM (SDRAM). The memory controller may also have some address generation capability for accessing sequences of pages.

The core logic is typically comprised of a chip-set, with one or more chips typically being "address and system controller intensive" and one or more chips typically being "data intensive." Among other things, the address intensive chip(s): interfaces CPU 101 with address bus 103; maintains cache memory, including the cache tags, sets associative cache tags and other data necessary to insure cache coherency; performs cache "bus snooping"; generates the control signals required for DRAMs in the system memory or cache; and controls general management transactions. The data intensive chip(s) generally: interfaces CPU 101 with the data bus 102; issues cycle completion responses; may abort operations if their cycles are incomplete; and arbitrates for the data path of bus 102.

In an alternative embodiment, core logic may be implemented in a single chip architecture in which one or more processors, memory and the core logic memory controllers are fabricated on one chip.

CPU 101 communicates with system memory 106 via core logics/memory controller 105 through an SRAM interface, SRAM cache 104. The fast SRAM interface is integrated into system memory 106. In an embodiment of CPU system 100a and 100b according to the principles of the present invention, integrated SRAM cache 104 plays the role of external (L2) cache in the prior art. The CPU may also maintain a predetermined amount of on-chip (L1) cache. Integrated fast SRAM, such as SRAM cache 104, may be particularly adapted to embodiments of the present invention implemented in a single chip architecture, wherein all of the circuitry disclosed herein is implemented in a single integrated circuit. Such single chip embodiments may be advantageous in "palm top" computers and "personal assistants."

PCI bus bridges, such as PCI bus bridge 109, are also well known to those skilled in the art. In the typical PC, the CPU is the bus master for the entire system and hence devices such as PCI bus bridge are slave devices which operate under command of the CPU.

Peripherals 108/111 may include a display controller and associated frame buffer, floppy drive controller, disk driver controller, and/or modem, to name only a few options.

The principles of the present invention may advantageously be embodied in multiprocessing devices and systems. An embodiment of such a multiprocessing system is illustrated in FIG. 2 in which multiprocessor architecture 200A is depicted. In the multiprocessor system 200A, multiple CPUs, CPU 201A and CPU 201B, communicate with an integrated system memory 202 via core logic memory controller 203. CPU 201A and CPU 201B are coupled to core logic memory/memory controller 203 via the respective buses, 204A and 204B. Bus 204A and Bus 204B carries both data and address information. Addresses are presented by core logic/memory controller 203 to integrated memory 202 on address bus 205. Preferably, address bus 205 is non-multiplexed, whereby the full address required to access a word in memory is presented simultaneously and synchronized with a system clock. Data are routed between integrated memory 202 and core logic/memory controller 203 on data bus 206. In accordance with the principles of the present invention, data bus 206 is non-multiplexed whereby each memory array within integrated memory 202 has dedicated data lines within data bus 206. In this way, one CPU, for example, CPU 1, 201A, may read or write to one memory array with an integrated memory 202 while CPU 2, 201B, may read or write from a second memory array with an integrated memory 202. Control information is communicated between core logic/memory controller 203 and integrated memory 202 on control line 207. In an embodiment of multiprocessor system 200A, in accordance with the principles of the present invention, multiprocessor system 200A may preferentially be implemented on a single chip. It would be understood by one of ordinary skill in the art that multiprocessor system 200A may include a predetermined number, n, number of processors 201.

Figure 2A:
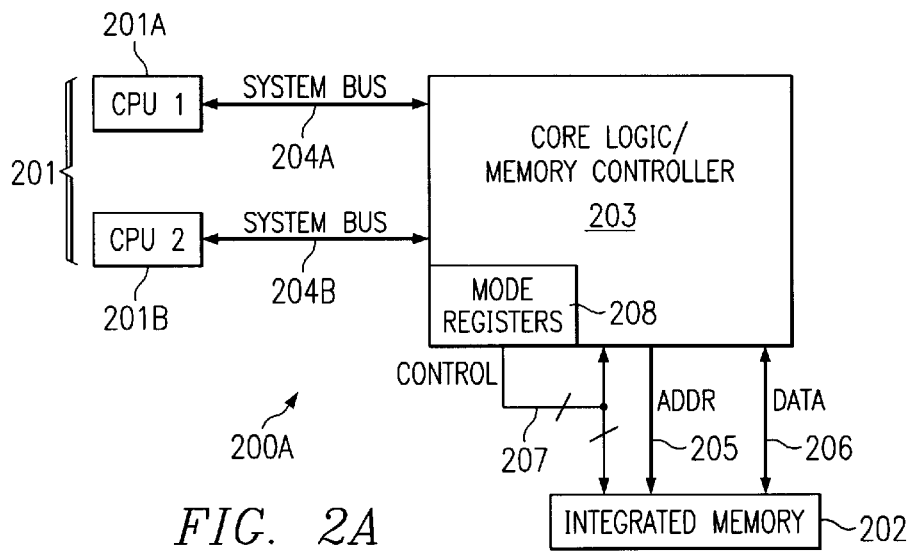
FIG. 2A is a drawing, in block form, of an embodiment of multiprocessor system according to the principles of the present invention.
Figure 2B:
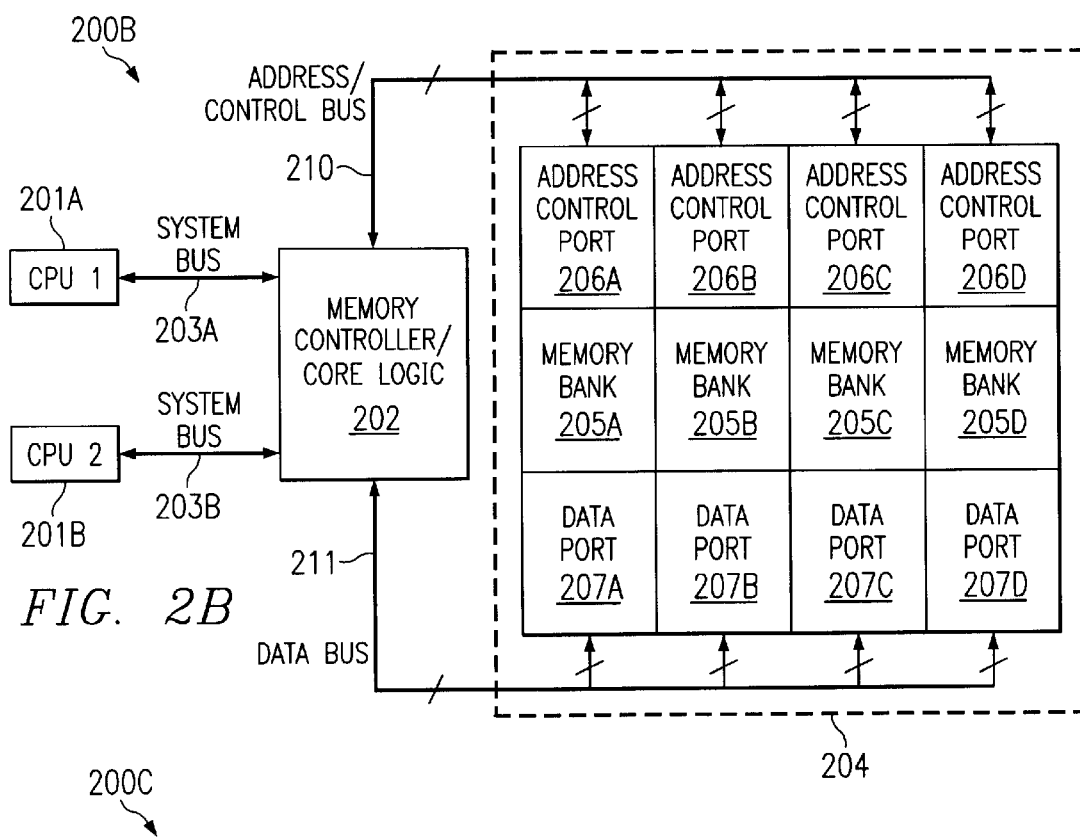
FIG. 2B is a drawing, in block form, of an alternative embodiment of a multiprocessor system according to the principles of the present invention.

In FIG. 2B, another embodiment of a multiprocessor system 200B employing the principles of the present invention is depicted. In multiprocessor system 200B, a first CPU, CPU 1, 201A, and a second CPU, CPU 2, 201B, are coupled to core logic memory controller 202 via system bus 203A and system bus 203B, respectively. Core logic/memory controller 202 mediates communication between CPU 1, 201A, and CPU 2, 201B, with system memory 204. System memory 204 includes a plurality of memory arrays 205. Each of memory arrays 205 includes an address/control port 206 and a data interface 207. Address/control ports 206 are coupled to core logic/memory controller 202 via address/control bus 210. Address/control bus 210 may include address lines for addressing the full address space of system memory 204. Thus, address lines with an address/control bus 210 preferably are nonmultiplexed.

Data are transferred between system memory 204 and core logic/memory controller 202 on data bus 211. Each of memory arrays 205 is coupled to data bus 211 through its own data port 207. Thus, CPU 1, 201A, and CPU 2, 201B, preferably may access system memory 204 simultaneously. Where an address conflict arises because more than one CPU is attempting to address the same memory array 205, a processor serving as a master may resolve the conflict. In one such embodiment, core logic/memory controller 202 may itself be a general-purpose processor whereby it serves to establish a priority among contenders for access to system memory 204. Alternatively, one of the multiprocessors in multiprocessor system 200B may serve as the master. Although multiprocessor system 200B has been illustrated as having two multiprocessors, CPU 1, 201A, and CPU 2, 201B, it would be understood by one of ordinary skill in the art that multiprocessor system 200B may include a predetermined plurality of multiprocessors, N, in number, where N has a predetermined constant value. In an embodiment of the present invention having N processors, processor access may be sequenced, so that the memory is continuously operational. In this way, periods during which memory is idle may be reduced. Multiprocessor system 200B preferably is implemented in a single chip architecture. System memory 204 will be discussed further below.

Figure 2C:
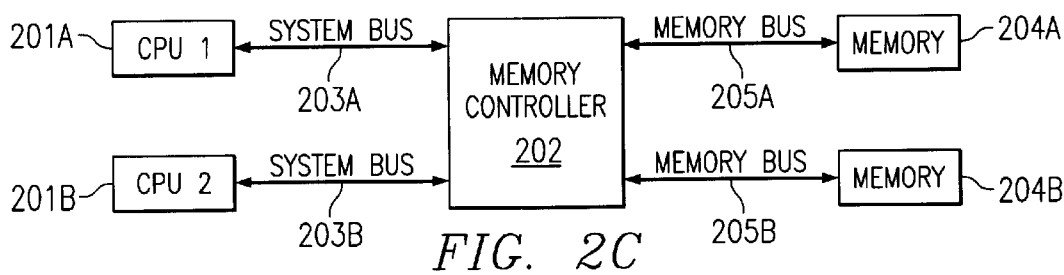
FIG. 2C is a drawing, in block form, of another alternative embodiment of a multiprocessor system according to the principles of the present invention.

Yet another embodiment of a multiprocessor system according to the principles of the present invention, multiprocessor 200C, is depicted in FIG. 2C. Multiprocessor system 200C includes CPU 1, 201A, and CPU2, 201B, coupled to a memory controller 202, via system bus 1, 203A, and system bus 2, 203B, respectively. Multiprocessor system 200C includes multiple memory units, memory 1, 204A, and memory 2, 204B, coupled to memory controller 202, via memory bus 1, 205A, and memory bus 2, 205B, respectively. Preferably, memory controller 202 serves as a "cross bar" switch whereby either of CPU 1, 201A, or CPU 2, 202B, may be dynamically coupled to either of memory 1, 204A, or memory 2, 204B. System bus 203A and system bus 203B include address, data, and control lines. Similarly, memory bus 205A and memory bus 205B include address, data, and control lines. Preferably, system bus 203A and system bus 203B have nonmultiplexed address lines whereby each of CPU 201A and CPU 201B may address the full memory space of memory 204A and memory 204B combined. In such an embodiment of the present invention, memory controller 202 resolves the addresses on the address lines in system bus 203A and system bus 203B and couples CPU 201A and CPU 201B to memory 204A or memory 204B. as appropriate, depending on the resolution of the addresses appearing on system bus 203B. Memory 204A and memory 204B may each be multibanked memory. Memory bus 205A and memory bus 205B both include bidirectional data lines for transmitting data between memory 204A, memory 204B, CPU 201A, and CPU 201B via memory controller 202. Data transmitted to CPU 201A or CPU 201B via memory controller 202 are carried on data lines within system bus 203A and system bus 203B, coupled to CPU 201A and CPU 201B, respectively. Depending on the address resolution, data lines within either memory bus 205A and memory bus 205B may be coupled to either of data lines within system bus 203A or system bus 203B through memory controller 202. In an embodiment in which memory 204A and memory 204B are multibank memory, data lines within memory bus 205A and memory bus 205B preferentially are nonmultiplexed, as are data lines within system bus 203A and system bus 203B. In such an embodiment, CPU 201A and CPU 201B may simultaneously access either memory 204A or memory 204B.

Memory controller 202 may include a general-purpose processor serving as a bus master whereby address conflicts may be controlled. Simultaneous access to system memory, such as memory 204A or memory 204B will subsequently be discussed in more detail when memory in accordance with the principles of the present invention, such as memory 204A or memory 204B are further described.

Although multiprocessor system 200C has been illustrated having two CPUs, CPU 201A and CPU 201B, it would be understood by one of ordinary skill in the art that the principles of the present invention may be embodied in a multiprocessor system having a plurality of multiprocessors, N, where N is a predetermined number of CPUs. Similarly, multiprocessor system 200C may have a predetermined plurality of memory units, M, where M is a predetermined number of system memory units 204. Moreover, it would be further understood by one of ordinary skill in the art that memory 204A and memory 204B need not be identical in structure. For example, it may be desired that one or more of a plurality of system memory units 204 be associated with a graphics or video controller whose memory access characteristics are "page" intensive. In such an embodiment, it may be preferred that memory, such as memory 201A and memory 201B be configurable "on the fly." Configuring memory 201A and memory 201B in dynamical fashion will be discussed when memory in accordance with the principles of the present invention are further described in detail below. Multiprocessor system 200C may preferably be implemented in a single chip architecture.

At the highest system level, there are a number of ways to implement the hardware architectures shown in FIGS. 2A, 2B and 2C in a complete hardware/software system. Three such systems are shown in FIGS. 3A–3C, respectively.

Figure 3A:
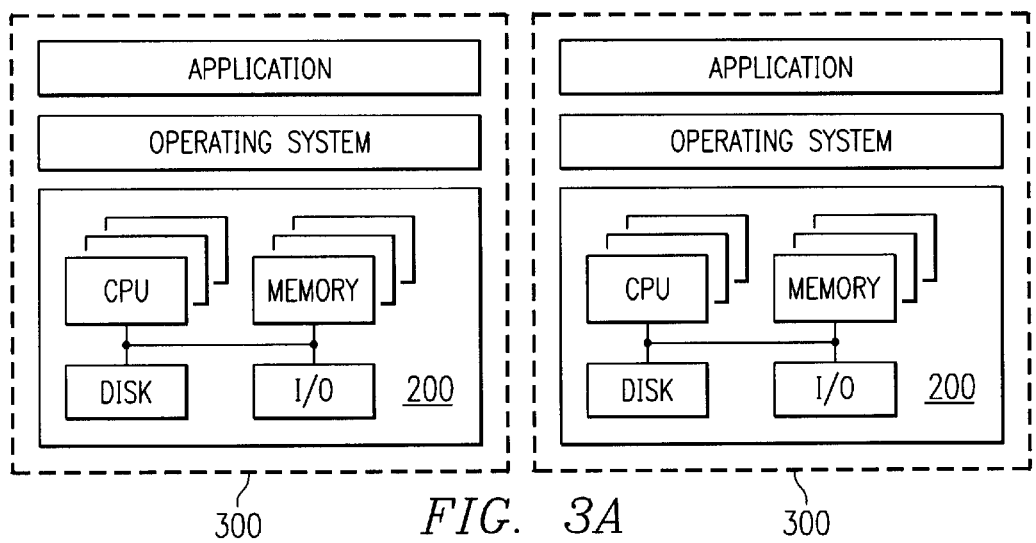
FIG. 3A is a diagram illustrating a "loosely coupled" multiprocessing architecture in which each processing node maintains a dedicated copy of the operating system and a dedicated copy of the applications program.

FIG. 3A is a diagram illustrating a "loosely coupled" multiprocessing architecture. In the loosely coupled architecture, each processing node 300 maintains a dedicated copy of both the operating system and the application programs. Loosely coupled architectures, such as that shown in FIG. 3A, are used often in embedded systems and in real-time systems in which tasks must be partitioned to different processing nodes for synchronization purposes. Embedded systems include those in which the CPU is fabricated on the same chip as logic, memory, a signal processor, or the like. In a multiprocessor system according to the principles of the present invention, single chip implementations are preferred. High speed interconnects are used to share data and pass messages between processing nodes 300. While loosely coupled systems are more fault and error tolerant, their software programming is most often highly complex.

Figure 3B:
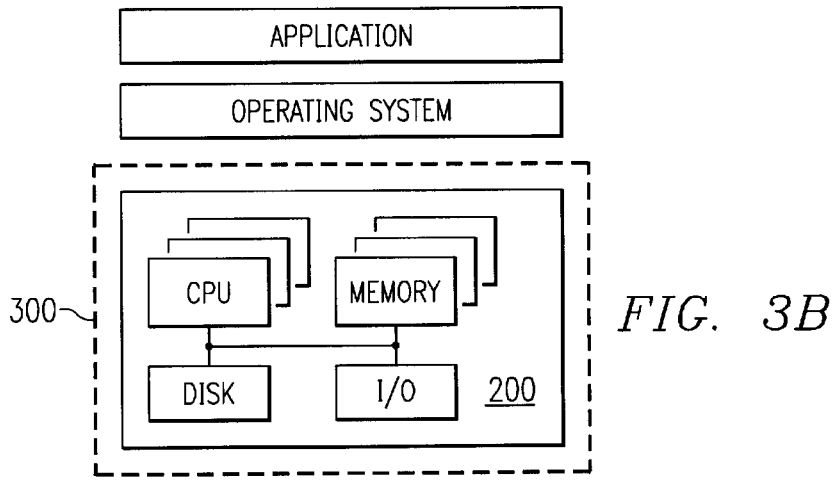
FIG. 3B depicts a "tightly coupled" multiprocessing system in which all processing nodes share a single copy of the operating system and a single copy of the applications program.

FIG. 3B depicts a "tightly coupled" system. In this case, a single copy of the operating system and a single copy of the application program are shared and executed by a single set of processors. Advantageously, writing software programs for a tightly coupled system is normally simpler than for writing programs to a loosely coupled system. However, tightly coupled systems, based only on single copies of the application programs and operating system, are less tolerant to errors and failures than the loosely coupled systems.

Figure 3C:
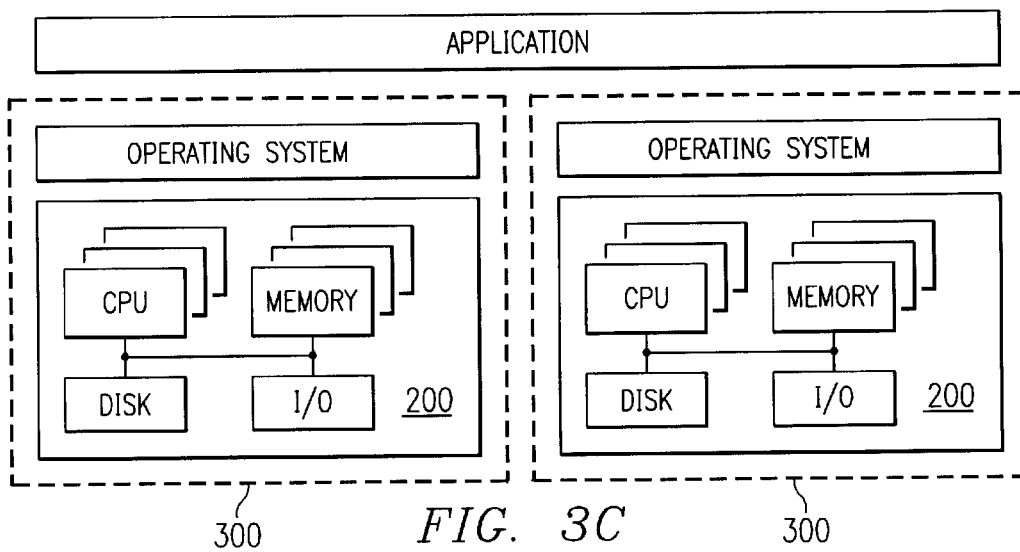
FIG. 3C depicts a diagram of a "snugly coupled" multiprocessing system in which each processing node maintains a dedicated copy of the operating system and all nodes share a single copy of the applications program.

FIG. 3C is a diagram of a "snugly coupled" system in which each processing node 300 maintains a dedicated copy of the operating system and all nodes share a single copy of the applications program. The snugly coupled variation is a hybrid which provides the tolerance to failure/errors found in loosely coupled systems while still providing the simpler program found in tightly coupled systems.

Generally, a multiprocessor system will act differently depending upon the type of processor employed. For example, a CISC CPU may be "latency" dominated while a digital signal processor (DSP) based system may be "dataflow" dominated. Further, pipelined processing algorithms typically are dataflow intensive, since the processors perform operations on streams of data received from other processors in the system and then pass the results on to other processors.

There are major challenges which must be addressed in the design of almost any multiprocessing system. In each of the embodiments of systems 200A–200C, system memory is shared by a plurality of processors. A technique must be developed to handle the situation in which several processors attempt to simultaneously access the shared memory, so-called memory contention. This problem is compounded by the fact that the contention issues must be dealt with from design to design, since different processors interface with memory differently. For example, a RISC processor requires substantial memory space while a CISC processor requires substantial register space.

In a memory device or subsystem with a single data input/output port and a single address port, contention problems can be solved by "memory locking." In this case, while one CPU (or controller) is accessing a given memory device or subsystem, the other CPU (controller) is "locked out" and cannot access that same device/subsystem. Memory locking is a memory management task which may be performed by the memory management unit (MMU) on-board the CPUs themselves or by a stand-alone device or subsystem. In any event, memory locking reduces the efficiency which multiprocessing was intended to increase, since during a contention situation, at least one processor must wait to access data.

Another major challenge is the software design. Symmetric multiprocessing operating systems are preferred, since this type of operating system is capable of seamlessly passing application programs to the CPUs as they become available. As discussed above, the selection of between tightly, loosely and snugly coupled software architecture requires substantial trade-offs, and in particular trade offs between ease of programming and fault/error tolerance.

Further, when multiple processors (or controllers) are coupled to the same bus, bus contention problems may also arise. Specifically, when a shared bus is employed, only one processor is normally granted access to the bus to perform a given bus task, while the remainder of the processors coupled to that bus must wait until their priority has been reached. One technique for minimizing bus contention problems is to provide a dedicated cache for each CPU so that a given CPU need only access the bus at times when required data are not found in the dedicated cache. As a result, cache coherency is a major concern in the design of a multiprocessing system. In other words, when a given processor modifies a location in memory, some technique must be provided for insuring that the data is modified in the cache memory of each of the other processors using the same data.

Figure 4:
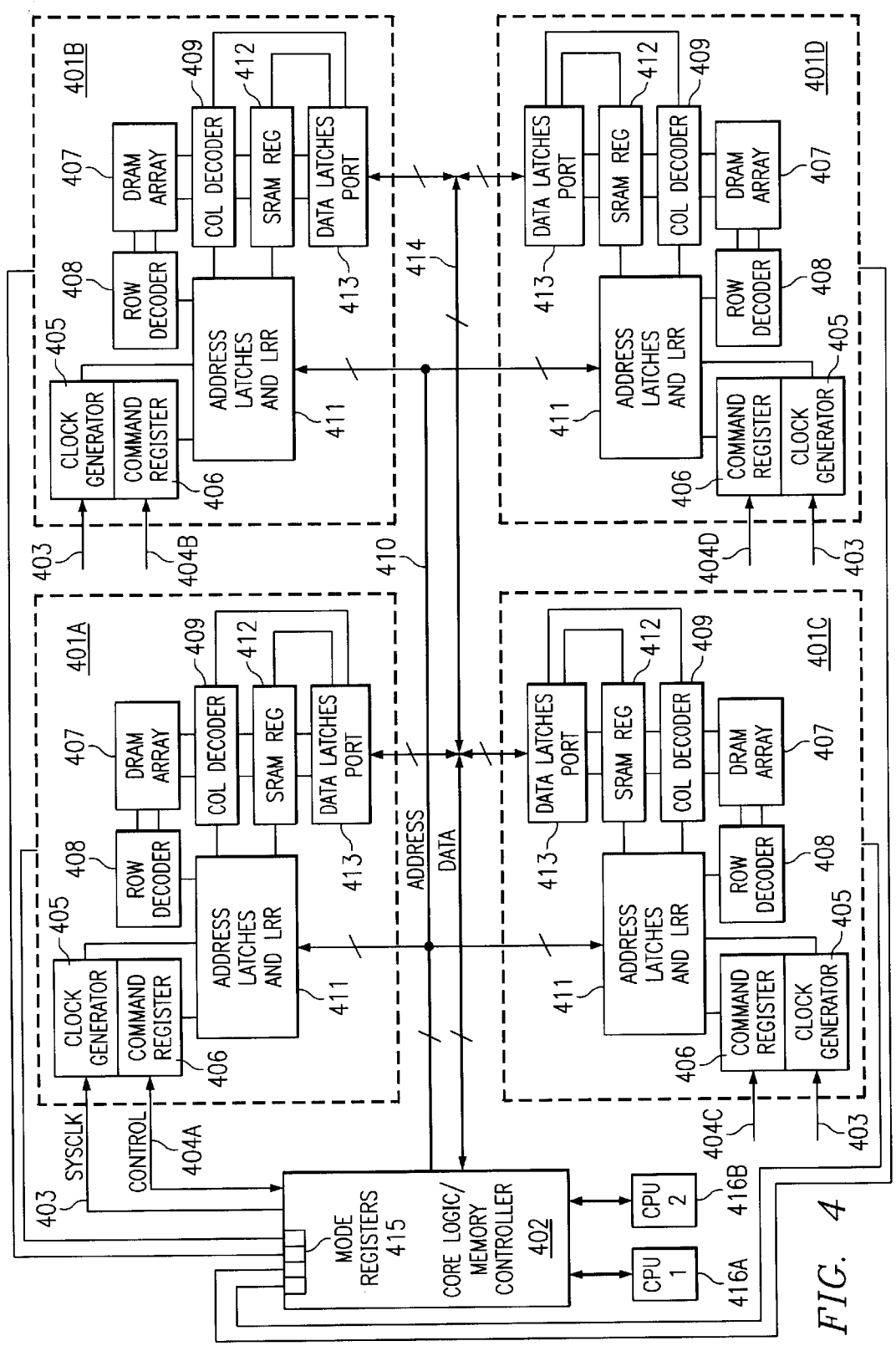
FIG. 4 illustrates a more detailed functional block diagram of a multiprocessor system according to one embodiment of the principles of the present invention.

Refer now to FIG. 4 in which an embodiment of a multiprocessing system 400 in accordance with the principles of the present invention is illustrated. Multiprocessing system 400 includes a plurality, N number of memory banks 401, with four such banks, 401a, 401b, 401c, and 401d being shown in FIG. 4. Although four banks are shown in FIG. 4 for illustration, an actual number of banks will vary from application to application.

Memory banks 401 send and receive data, addresses and control signals via memory controller/core logic 402.

A system clock (SYSCLK) 403 and command signals 404 are received by a clock generator 405 within each bank and a command register 406, likewise in each bank, respectively. Preferably, memory banks 401 operate synchronously whereby all memory operations are synchronized with the system clock 403. Internal memory clock signals synchronized to system clock 403 are generated within clock generator 405. Each of memory banks 401a–401d also receives a corresponding command signal 404a–404d. Command signals 404 are stored within command register 406, and inform each of the respective memory banks 401 whether the pending operation in the respective bank is a read operation or a write operation. Thus, simultaneous reads and writes may be made to each of memory banks 401 in accordance with the principles of the present invention. Command signals 404 may also selectively activate or deactivate one or more of memory banks 401.

Each bank 401 includes an array 407 of dynamic random access memory (DRAM) cells arranged in N number rows and M number columns. As is known to those skilled in the art, each array 407 may be partitioned into multiple subarrays, with the columns organized using either an open-bitline or folded-bitline approach. Each bank 401 further includes a traditional DRAM decoder 408 coupled to the array word lines, and traditional DRAM sense amplifiers/column decoder circuitry 409 coupled to the array bitlines. The row and column decoders are preferably organized in hierarchical fashion in which a main decoder and one or more levels of subdecoders/drivers are used. Generally, each row decoder 408, in response to a row address, selects one of N rows for access in response to system clock 403. Because memory banks 401 preferably operate in synchronous fashion, an active memory cycle is timed off of SYSCLK 403 rather than a row address strobe signal as in nonsynchronous DRAM. A column decoder 409 selects P number of pages (locations of C number of columns (bits) from the M total number of columns in response to P number of column addresses for access during an active cycle.

Memory banks 401 receive addresses from core logic/memory controller 402 on address bus 410. The addresses are received in address latch and last row read (LRR) 411 in each of memory banks 401, and latched on an edge of SYSCLK 403 during an active command signal 404. Address bus 410 may be a multiplexed bus. However, it is preferred that address bus 410 be nonmultiplexed whereby row addresses and column addresses are presented simultaneously, and thereby latched simultaneously in response to SYSCLK 403. Thus, address bus 410 spans the entire address space of memory 400, in a preferred embodiment in accordance with the principles of the present invention. Within an address space of W bits in width, a number of bits, R, are row address bits, and a number of bits, W-R, are column address bits. Within the portion of the address space corresponding to the row addresses, a number of bits, B, serve as bank select bits.

According to the principles of the present invention, each bank 401 further includes static random access memory (SRAM) registers/SRAM column decoder circuitry 412. SRAM circuitry 412 will be discussed in further detail in conjunction with FIG. 6 but can generally be described at this point as follows. First, a linear array of M number of SRAM cells is included for storing the row of data transferred from the corresponding DRAM array 407. Alternatively, another embodiment of the present invention may have a plurality, n, of linear arrays of M cells. Second, SRAM decoder circuitry is included for page accesses (reads and writes) of C-bit wide pages of data to the addressed row of data in the SRAM array in response to one or more column addresses.

Data latches/port 413 interface the DRAM sense amplifiers/column decoders 409 and the SRAM registers/column decoders 412 with a data bus 414. Data bus 414 is preferably a nonmultiplexed data bus. In such an embodiment, in accordance with the principles of the present invention, memory 400 represents a multi-port memory for data. Data latches/port 413 incorporates circuitry for bidirectional access to the latches for interfacing with data bus 414, which is a bidirectional bus. Each of data latches/port 413 may correspond to a data port of K (where K is a predetermined integer) data bits in width. Then, data bus 414 may preferably be 4K data bits wide.

Mode registers 415 are used to configure memory banks 401. This may entail setting optional access modes such as page reads and writes or burst access with a selected burst type. Mode registers 415 may also contain bits activating or deactivating one or more of banks 401. The specification of mode register data subsequently will be discussed in detail. In multiprocessor system 200A the mode registers 208 have been illustrated as being incorporated in core logic/memory controller 203. However, it will be recognized, particularly in the preferred single chip implementation, that such an incorporation is not essential to the practice of the present invention, and that the mode registers may be implemented within other structures on the chip. Whether the mode registers are incorporated within the memory controller circuitry, or elsewhere in the chip, each memory bank 401, is associated with a corresponding mode register, and coupled thereto by the corresponding mode register bus 418. Core logic/memory controller 402 configures memory bank 401 under the control of CPUs 416a and 416b, coupled to core logic/memory controller 402 by system busses 417a and 417b, respectively.

Multiprocessing system 400 has been illustrated as having two processors CPU 416a and CPU 416b. It would be understood that this is illustrative only and that other embodiments of multiprocessing systems according to the principles of the present invention may have a predetermined number, n, of CPUs.

Figure 5:
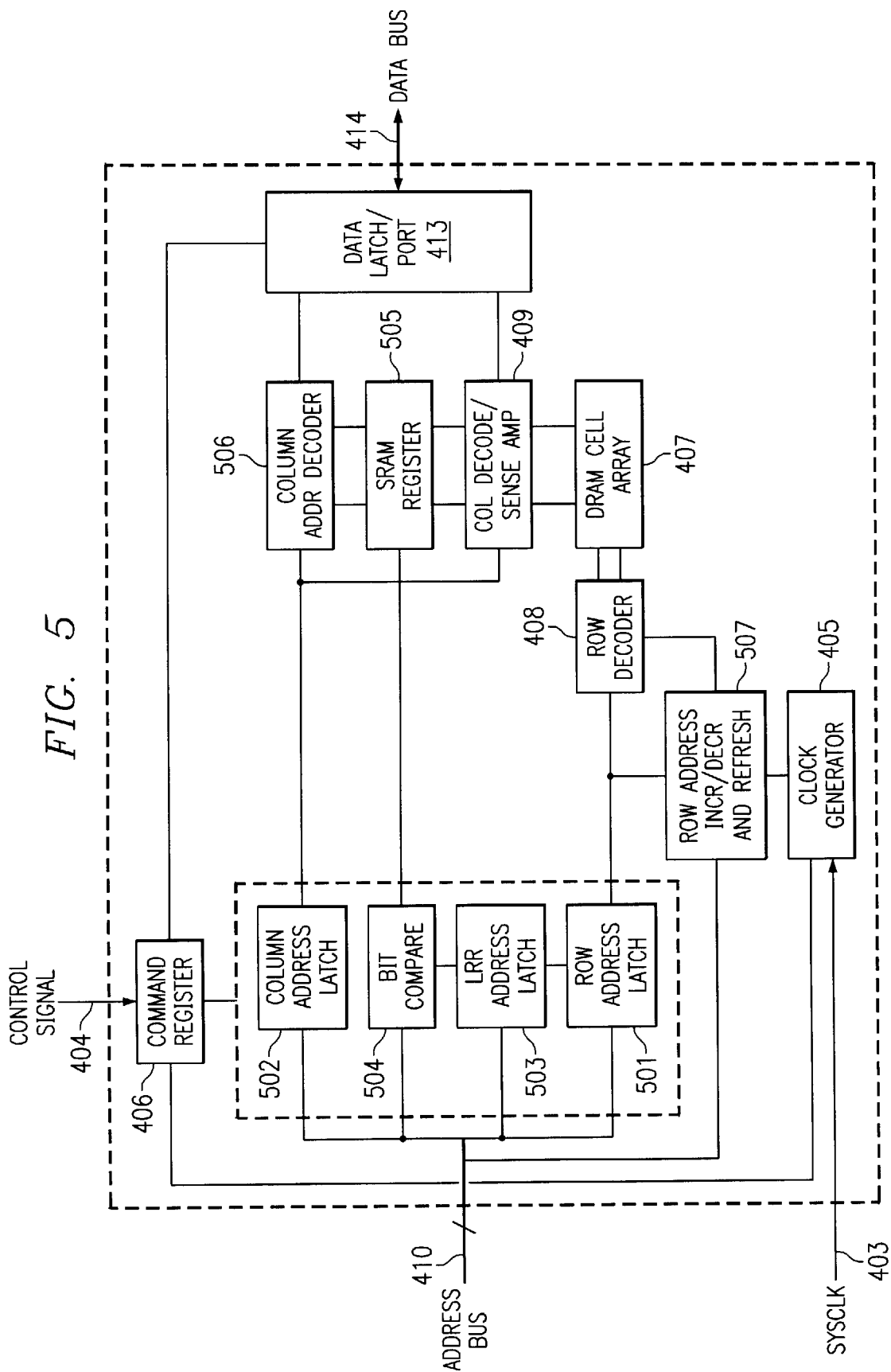
FIG. 5 depicts a more detailed diagram emphasizing the data and address routing circuitry of the system shown in FIG. 4.

FIG. 5 is a more detailed diagram emphasizing the data and address routing circuitry of a selected bank 401. Preferentially, addresses are received in nonmultiplexed fashion on address bus 410. The row address bits are latched into row address latch 501 on the falling edge of SYSCLK 403 while an active command is asserted on command bus 404. Simultaneously, a first column address, represented by column address bits in address bus 410, is latched into column address latch 502. The row address bits from the previous memory access cycle are transferred to the last row read (LRR) latch 503 when the current row address is latched into row address latch 501. Comparison circuitry 504 compares the present address latched into row address latch 501 with the last read row address held in latch 503.

SRAM registers 505 store data associated with the row address bits stored in last read address latch 503. A second column decoder 506 is provided to access locations in SRAM registers 505. Row address increment/decrement and refresh control circuitry 507, when enabled, steps through the rows of DRAM cell array 407 to perform cell refresh through the DRAM sense amps, and implements the address transformations detailed below. Refresh is timed off of SYSCLK 403 through clock generator 405.

During an access, an address is received on address bus 410. As previously described, the address is latched on a falling edge of SYSCLK 403, provided an active command has been transmitted to command register 406. If the active command corresponds to a read operation, then one of two read methods may be selected. Selection may be made by asserting or negating, depending on the read method to be used, a configuration bit in command register 406.

In the first method of reading, comparator 504 in bank 401 corresponding to the address space of the row address received is enabled. Following the sending of the read command to command register 406, and the latching of the address on the falling edge of SYSCLK 403, a predetermined "row" latency elapses before data appears at data latches 413. During this latency period, comparator 503 compares the current row address in row address latch 501 and the address stored in LRR address latch 503. If a match occurs for the corresponding bank, the SRAM column address decoders 506 are selected and set-up to access the SRAM register 505 of that bank. In an alternative embodiment in which SRAM register 505 includes a plurality of rows, comparator 504 outputs row select bits, to SRAM register 505. SRAM column decoder 506 allows access to a C-bit word at the column address latched into column address latch 502. This data is set up on the C-bit wide portion of data bus 414 corresponding to the active bank 401 via data latch/port 413. Alternatively, the SRAM may be sufficiently strong to drive data bus 414 directly. In such an embodiment latching circuitry need not be included in data latch/port 413. Data from subsequent column address locations are clocked into data latch/ports 413 on succeeding cycles of SYSCLK 403, depending on the selected read mode. Preferably, the enabled bank is the only bank 401 accessed by a data bus 414, the word of data in data latches 413 of the other banks is simply not used. This will be discussed further below.

If the address bits in latches 501 and 503 do not match for the selected bank 401, access must be made to the corresponding DRAM array. Specifically, for a read to the address bank 401, the row is selected by DRAM row decoder 408 from the corresponding DRAM array 407 and an entire row of data transferred to the associated SRAM register 505 for output following the selected latency period. For the remaining banks 401, the row addresses, with the bank select bit portions ignored, are incremented or decremented using the corresponding row address increment circuitry 507. A row of data from these banks is similarly transferred to the corresponding SRAM register 505 and the new address is latched into the CRR latch 503 for those banks on the next cycle.

Assume for example, in the illustrated four bank system, that the received row address indicates the address space of bank 401b (Bank1) is to be accessed. Bank1 is then enabled to make the comparison of the row current address and the address stored in Bank1 LRR latch 503. As above, the bank select portion of row addresses are ignored in the comparison. The row address MSBs as received are not modified for transferring data from the bank 401b DRAM array 407 to the Bank1 SRAM 505. However, for bank 401a (Bank0) the row address, ignoring bank select bits, is decremented by 01 by the corresponding row increment circuitry 507 and the row address for banks 401c (Bank2) and 401d (Bank3) are incremented by 01 and 10, respectively, again bank select bits are ignored. In other words, if the address to Bank1 is designated address A+1, then address A+1 is decremented by one such that Bank0 receives address A0 and incremented such that Bank2 receives address A+2 and Bank3 receives address A+3. These addresses are used to access the associated bank's DRAM array 407 and the accessed data in DRAM transferred to the SRAM arrays. The new addresses are stored in address latches 501.

During accessing of the addressed bank, assuming again for discussion purposes BANK1, the DRAM of any bank, including in this case the DRAM array 407 of Bank1 can be refreshed. The DRAM column decoders 409 isolate the corresponding DRAM arrays 407 from the SRAM registers 412. Thus, while data is being accessed from the SRAM array of the selected bank 401, any or all of the DRAM arrays 407 can be refreshed without disturbing the data in the SRAM arrays. Refresh is preferably performed by incrementing the row addresses in each bank using increment and refresh circuitry 507 and latching each row of data using the DRAM sense amplifiers 409 in a conventional fashion.

In the preferred embodiment, once the data in the SRAM array 505 of the addressed bank has been accessed, the memory access cycle is complete. The data in the SRAM arrays 505 of the remaining banks 401 is available through the associated data latches 413, and could be used, but typically is reserved for future memory access cycles. The current row address for the accessed banks and the new row address for the non-accessed banks are transferred to the LRR registers. The LRR bits are pipelined from row address latches 501 synchronous with SYSCLK 403 such that they are available to bit comparators 504 at the start of the next memory cycle. The corresponding data remain in the SRAM arrays. Advantageously, since the CPU and/or operating system typically accesses data within temporally or spatially adjacent areas in memory, the probability is substantial that a match will occur.

For a write operation the following is the preferred method. An address is received on address bus 410. As above, a bank select bit portion of the address determines the bank 401 assigned to the corresponding row address space. Assume again for example, bank 401b (Bank1) is addressed. The received row address, with bank select bits ignored, is are taken as the address to the Bank1 DRAM array 407. As was done above, the row address increment circuitry 507 for Bank0 decrements the received row to obtain a row address to the Bank0 DRAM array and increments the received address by 01 and 10 to obtain row addresses to the DRAM arrays of Bank2 and Bank3, respectively. In each instance, bank select bits are ignored. The row address bits for each bank 401 is written into the respective bank's LRR register 503.

In the second method of accessing, which may be selected by asserting a configuration bit in command register 406, the received address, less bank select bits, is compared by all the comparators 503. If a match occurs in any one or more banks 401, the data from all the banks is taken, although the data from the non-matching banks may be discarded or left in the data latches.

Figure 6:
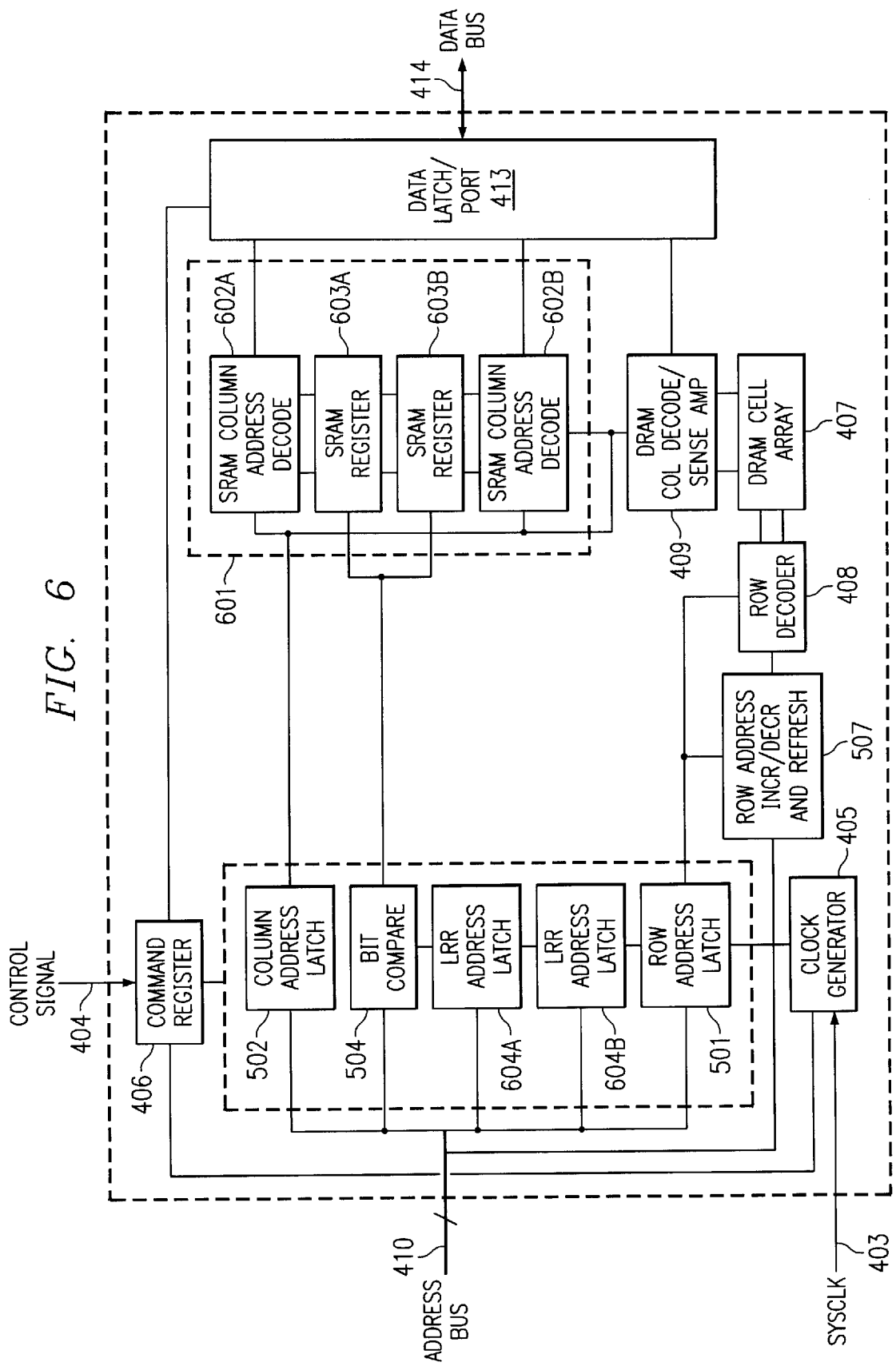
FIG. 6 depicts a second dynamic random access memory device according to the principles of the present invention.

Refer now to FIG. 6 in which is illustrated a memory bank 600 including an embodiment of an SRAM cache 601 according to the principles of the present invention.

As shown in FIG. 6, each SRAM cache 601 includes a plurality of SRAM column decoders 602 coupled to a corresponding SRAM register 603. In the illustrated embodiments, two SRAM registers 603a and 603b, associated with a pair of SRAM column decoders 602a and 602b are shown for brevity and clarity. However, it should be recognized that an SRAM cache 601 may be constructed with additional SRAM registers 603 along with a corresponding number of SRAM decoders 602.

Additionally, a corresponding number of LRR latches 604 are provided to support the multiple SRAM registers 603. Hence, if in a given embodiment includes n number of registers 603, there will preferably also be n number of LRR registers 604, although this is not an absolute requirement. In the illustrated embodiment where two SRAM registers 603a and 603b are depicted, a corresponding pair of LRR latches 604a and 604b are also shown.

DRAM cell array 407, row address decoder 408, address latches/LRR comparison circuitry 504 and row address increment/decrement and refresh circuitry 507 all substantially operate as described above.

Assume that each DRAM cell array 407 is arranged in m number of rows and n number of columns. Row address decoder 408 will be coupled with the wordline controlling access to each row of cells. In the most straightforward embodiment, n number of sense amplifiers are provided with one sense amplifier coupled to a bitline associated with each column of cells. DRAM column decoder/sense amplifiers 409 includes a data interface with SRAM column decoders 602 allowing data to be exchanged, between DRAM array 407 and SRAM registers 603, either individually or in combination. SRAM and DRAM column decoders 602 and 409 are all coupled to column address latch 504.

In the illustrated embodiment, DRAM array 407 may be n columns wide and each SRAM register 701 correspondingly may be a linear array of n number of cells disposed in a single row. In such an embodiment, the cache width is n and the cache depth is two. Each row in either cache or DRAM memory stores p number of cache lines, wherein p equals n divided by b, the number of bits per cache line.

The multiple SRAM register/column decoder structure of each SRAM cache 601 has further advantages. For example, if SRAM column address decoders 602 are static devices, then while DRAM cell array 407 of any bank 601 is in precharge, one or more of the corresponding SRAM registers 603 can be accessed either in a random or page fashion. Of course, column address decoders 409 can be dynamic devices which are inactive during precharge thereby providing for substantial power savings across the banks 600.

SRAM registers 603 of given bank 600 can be used in various combinations with the associated DRAM cell array 407 and its column decoder 407 to optimize data exchanges. For example, one SRAM register 603 of the selected bank 600 can access data through data latches 413, while simultaneously data can be exchanged between the associated DRAM cell array 407 and any of the remaining SRAM registers 603 in the same cache unit 601. At the same time, data exchanges can occur between the SRAM registers 603 and the associated DRAM cell array 407 of each of the other banks 601.

For any SRAM registers 603 in memory 400 which are not being accessed through data latches, a number of different data exchanges between the data cell array 407 and the SRAM registers 603 can be set up. Among other things, the contents of a SRAM register 603 can be copied to a row in the corresponding DRAM cell array 407 or vice versa; data can be copied from DRAM to a SRAM register. During accesses through the data latches, each port can be individually configured such that reads and writes are made to the cache unit 601 only, to the DRAM cell array 407 only, or to both an SRAM register 603 in the cache 601 and to the DRAM array 407.

The multiple SRAM register embodiment of bank 600 illustrated in FIG. 6 allows for the selective implementation of one of a number of addressing schemes. For example, assume that the bank select portion of the row address received selects BANK 1 for access. Assuming a two SRAM register embodiment, the remaining row address bits are then compared with two addresses stored in the LRR address latches 604 (one corresponding to each row of data stored in a corresponding SRAM register 603). If a match occurs, then the SRAM register 603 corresponding to the matching addresses is accessed. In this case the probability of a match (cache hit) are increased since the number of SRAM registers in which the desired data could possibly be stored in has increased.

Alternatively, the multiple registers 603 of each bank 600 could be considered as residing in a single address space. In this case, the most significant bits of an incoming row address are compared against a single stored LRR address. If a match occurs, all of the SRAM registers of the given bank are then accessed in a predetermined sequence. Among other things, this scheme would allow paging of data in multiple page lengths, depending on the length of each row in SRAM and the number of SRAM registers accessed. Provisions can be made during the setup of Mode Registers 603 to accomplish varying embodiments.

In an additional alternative, data can be loaded from the DRAM arrays such that the data in a selected SRAM register in a given bank is associated with an address non-contiguous with the addresses associated with the contents of other registers in that bank. For example, row address increments/decrements 507 could be configured such that if Bank 0, SRAM register 603a is loaded with data corresponding to Addr0, the associated register 603b is loaded with data corresponding to Addr4. For bank 1 registers 603a and 603b are respectively loaded with data corresponding to Addr1 and Addr5. Similarly, the SRAM registers of Bank 2 hold data at addresses Addr2 and Addr6 and Bank 3 data at addresses Addr3 and Addr7. Numerous other combinations/permutations are possible.

Figure 7:
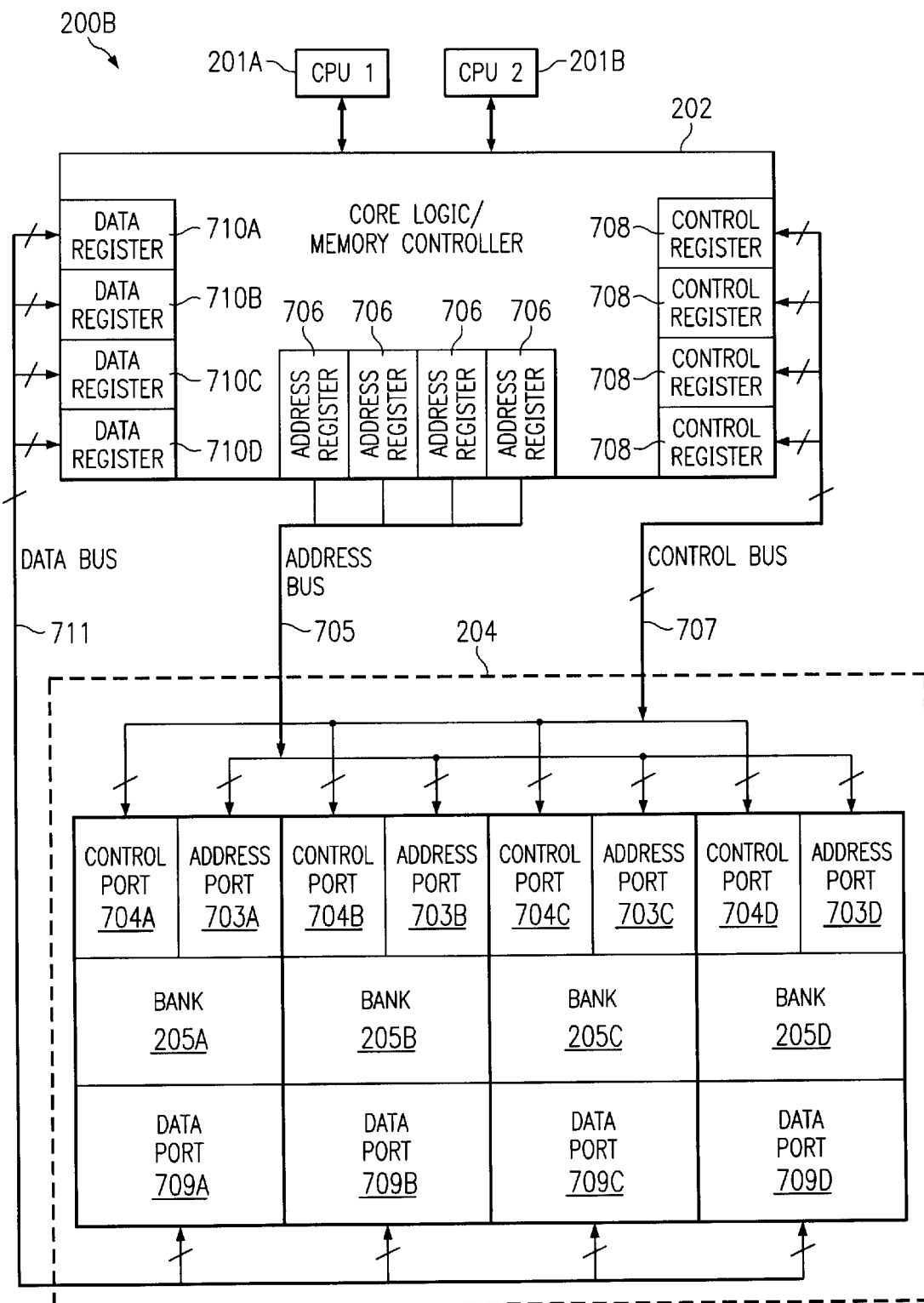
FIG. 7 depicts a more detailed drawing in block form of a memory system illustrated in FIG. 2C.

Refer now to FIG. 7 in which an embodiment of a multiprocessing system 200B is illustrated in further detail. Integrated memory 204, including four memory banks 205A–205D, is coupled to memory controller/core logic 202. Although integrated memory 204 is shown having four memory banks, it would be understood that other embodiments of integrated memory according to the principles of the present invention may include a predetermined number, N, of memory banks. Memory controller/core logic 202 interfaces integrated memory 204 with CPUs 201A and 201B coupled thereto via system busses 203A and 203B respectively.

In multiprocessing system 200B, each of memory banks 205 occupies its own region of the system memory address space. Each of banks 205A–205D has a corresponding address port 703a–703d for receiving addresses. Address port 703A may correspond to addresses Add0–AddX−1. Similarly, address port 703B is associated with addresses AddX–AddX+Y−1 when address port 703B is Y bits wide, address port 703C with addresses AddX+Y–AddX+Y+Z−1, address port 703C being Z bits wide, and address port 703D with addresses AddX+Y+Z–AddX+Y+Z+W−1 where address port 703D is W bits wide. If the system memory address apace is K bits wide, then X, Y, Z, and W must sum to K. In an embodiment of integrated memory 204 according to the principles of the present invention, X, Y, Z, and W may all be equal in which case each would be K/4 bits wide. However, it would be understood that this is not essential and other embodiments may have unequal values for X, Y, Z, and W.

Address ports 703 are coupled to memory controller/core logic 202 via address bus 705 which connects to memory controller/core logic 202 through address registers 706. Each of address ports 703A–703D communicates with memory controller/core logic 202 via its corresponding address register 706A–706D. In this embodiment, address registers 706 may independently interface CPU1 201A and CPU2 201B with memory 204. Thus, CPU1 201A and CPU2 201B may simultaneously access memory through memory controller 202.

Similarly, control signals are communicated through bidirectional control ports 704A–704D. Control ports 704 are coupled to memory controller/core logic 202 through control bus 707, which connects to memory controller/core logic 202 via control registers 708. Control bits sent back to memory controller 202 from banks 205 via control ports 704 may inform memory controller 202 that one of CPUs 201 is accessing a corresponding bank. Control registers 708 might also embody mode registers 415 in the multiprocessor system of FIG. 4. The bitfields associated with a mode register portion of control registers 708, or mode registers 415 in an embodiment according to multiprocessing system 400, will be described below.

Banks 205 send and receive data through data port 709. Just as in the embodiment of a multiprocessing system described in association with FIG. 4, each of banks 205A–205D has an associated data latch (not shown) coupled to the associated data port 709A–709D. Each of data ports 709 may be M bits wide in which case data bus 211 would be 4M bits in width, in an embodiment having four banks 205. Alternatively, data ports 707 need not be of equal width, although the widths of the respective busses would sum to a preselected bus width, L. Data bus 211 couples data ports 709 to data registers 710 in memory controller/core logic 202. Each of data ports 709A–709D is connected to a respective data register 710A–710D. In this way each of CPUs 201A and 201B may independently communicate with banks 205A–205D.

In an embodiment of integrated memory 204 according to the principles of the present invention, each memory bank 205 may include the circuitry of memory bank 600. In such an embodiment, command register 406 and clock generator are coupled to control port 704. Address bus 410 in FIG. 6 would then constitute address bus 705, and control signals 404 would constitute control bus 707. The operation of SRAM cache 601 (SRAM registers 603 and associated column decoders 602), DRAM cell 407, LRR address latches 604, row address latches 501, bit compare 504 and column address latches 502 is as described with respect to FIG. 6 and will not be repeated here.

However, in multiprocessor system 200B, the multiport address scheme means that the DRAM arrays 407 within each of banks 205A–205D can be simultaneously accessed. Additionally, the SRAM registers in each of the banks 205A–205D can be simultaneously accessed in the same manner as described in conjunction with FIG. 6. Moreover, control signals 404 may include processor select signals, whereby one CPU 201 may access a memory bank 205 and another CPU 201 simultaneously access a second memory bank 205. Memory controller/core logic 202 may be "intelligent," with capability as a general purpose processor serving as a "master" resolving memory conflicts among CPUs 201, and providing access prioritization. CPU accesses may be sequenced as well, thereby providing "continuously operational" memory. Such continuously operational memory might be implemented by sequencing SRAM accesses, or by accessing the DRAM continuously, within appropriate refresh constraints.

Multiprocessor system 200B is preferably implemented in a single chip approach. As such, it would be recognized that the structural blocks identified in FIG. 7 are somewhat arbitrarily drawn in that they better reflect functionality rather than discrete structural elements interconnected by other discrete structural elements. For example, address registers 706 and control registers 708 may be implemented, in alternative embodiments, with the integrated memory itself, rather than incorporated within the memory controller/core logic 202. That is, it would be understood that the incorporation of the address 706 and control registers 708 in memory controller 202 is not essential to the practice of the present invention, and that other embodiments may employ alternative topologies. Similarly, other structures forming multiprocessing system 200B might be arranged in alternative topologies. In such, CPUs 201 as well as memory controller 202 might themselves be processing engines within a multiprocessor. It would be recognized that these alternative topologies would be within the spirit and scope of the principles of the present invention.

FIG. 8 is a diagram of the bitfields associated with a mode register portion of control register 708, or mode register 415. Each of these bitfields can be described as follows.

Bits 0–2 set the burst length for integrated memory such as integrated memory 701. The burst length is the number of words clocked into or out of data latches/port 413 of the bank 702 in integrated memory 701 being accessed.

Bit 3 defines the burst type. In the illustrated embodiment, if zero is written into the bit 3 position, the burst output will be serial and if a Logic One is written thereto, an interleaved burst will take place.

The bitfield comprised of bits 4–6 define the read latency. Typically, it takes (slightly) longer to perform a write than it does to perform a read. A read after write, or write after read takes even longer, in today's commercial SDRAM's, especially when one switches from Bank X to Bank Y. In this invention, since all banks are normally 'on', there is no such penalty. In other words, the minimum write latency is slightly longer than the minimum read latency. These bits therefore allow the read latency to be adjusted to optimize read/write timing. Specifically, the burst latency is the delay in the output of the first bit of a burst of data from the high to low transition of SYSCLK during the assertion of a read command. The desired delay is generated using an internal clock optimized for DRAM operations with SRAM register operations.

In the illustrated embodiment, the bitfield consisting of bits 7–8, the bitfield consisting of bits 13–16, and bit 23 are reserved for future use.

Bit 9 is used to select between single word bursting and bursting in bursts of the length specified in the burst length register. For example, if a zero is written into the bit 9 position, then the write burst length will be as defined by the burst length bits written into the bitfield 0–2. If a logic one is loaded into bit position 9, the write burst length will be one word. In other words, writes will be made on a word by word basis.

Bit position 12 holds a bit which defines the adjustment resolution of the read data latency. If a zero is written into bit position 12, then the data latency is programmed in integers of the system clock CLK (e.g., latencies of 1, 2, 3, . . . n CLK periods). If a logic one is written into bit position 12, data latency is set in 0.5 clock increments (e.g., latencies of 0.5, 2.5, 3.5 . . . CLK periods).

The bitfield consisting of bits 17–20 holds the bank status bits. Using these bits, the CPU (and core logic) and operating system can selectively activate and deactivate banks such as banks 702 in integrated memory 701. Hence, the CPU is given the ability to repeatedly access a specified amount of memory. Further, by appropriately setting this register, predictive/speculative execution of instructions by the CPU can be implemented. The bit encoding for banks status bitfield is provided in Table 1.

TABLE I

| Bank Status Register Bits | | | | Bank Status | | | |
|---|---|---|---|---|---|---|---|
| 20 | 19 | 18 | 17 | $Bank_n$ | $Bank_{n+1}$ | $Bank_{n+2}$ | $Bank_{n+3}$ |
| 0 | 0 | 0 | 0 | A | D | D | D |
| 0 | 0 | 0 | 1 | D | A | D | D |
| 0 | 0 | 1 | 0 | D | D | A | D |
| 0 | 0 | 1 | 1 | D | D | D | A |
| 0 | 1 | 0 | 0 | A | A | D | D |
| 0 | 1 | 0 | 1 | D | A | A | D |
| 0 | 1 | 1 | 0 | D | D | A | A |
| 0 | 1 | 1 | 1 | A | D | D | A |
| 1 | 0 | 0 | 0 | A | D | A | D |
| 1 | 0 | 0 | 1 | D | A | A | D |
| 1 | 0 | 1 | 0 | D | A | D | A |
| 1 | 0 | 1 | 1 | A | A | A | D |
| 1 | 1 | 0 | 0 | D | A | A | A |
| 1 | 1 | 0 | 1 | A | D | A | A |
| 1 | 1 | 1 | 0 | A | A | D | A |
| 1 | 1 | 1 | 1 | A | A | A | A |

A = Active
D = Deactivated

The bitfield consisting of bit positions 21 and 22 is the SRAM output field. This field allows the CPU and operating system to selectively sequence through banks 202. The encoding for this field is provided in Table. II. In Table II, $Bank_n$ represents the bank which contains the target data, as identified by bit comparison circuitry using the procedure described above. From then on, depending on the bank status register bits, additional banks can be accessed in specified sequence.

TABLE II

| Register Bit 22 | Register Bit 21 | Bank Access Sequence |
|---|---|---|
| 0 | 0 | $Bank_n \rightarrow Bank_{n+1} \rightarrow Bank_{n+2} \rightarrow Bank_{n+3}$ |
| 0 | 1 | $Bank_n \rightarrow Bank_{n+1} \rightarrow Bank_{n+2}$ |
| 1 | 0 | $Bank_n \rightarrow Bank_{n+1}$ |
| 1 | 1 | $Bank_n$ only |

Assume for discussion purposes that an 01 is written into SRAM output bitfield. Also assume that, from the row address, comparator 504 has identified Bank 2 (702*b*) as the bank initially containing desired data. For the case where each bank includes two SRAM registers 603, the first SRAM register 603*a* of bank 2 is accessed followed by the second SRAM register 603*b* for that bank. In response to the 01 programmed into the SRAM output field, the next bank accessed is bank Bn+1 (i.e., Bank3) is accessed, with SRAM register 1 and SRAM register 2 sequentially accessed from Bank1. The process repeats itself for Bankn+2 (i.e., Bank4)

In this example, the loop of accesses from Banks 2,3 and 4 can continue as long as the CPU needs to repeatedly access those locations. It should be recognized that the access could also be made from the bank DRAM cell arrays 407 for the given bank in addition to the SRAM registers. If the looping option is chosen, the CPU and the operating system must be configured to recognize how data are stored and retrieved from the sequence of banks such that the proper data is accessed at the proper time. FIG. 9 is a timing diagram for a memory operation (read or write) operation in an embodiment of a multiprocessing system according to the principles of the present invention.

As is shown in FIG. 9, a read from or write to memory, such as integrated memory 600, is timed by SYSCLK. All timings of memory operations are synchronized to SYSCLK, with internal timings generated therefrom by clock generator 405.

On the falling edge of SYSCLK with an active command loaded in command register 406, a row address input on the address bus, such as address bus 205 in multiprocessing system 200A, or address/control bus 210 in multiprocessing system 200B is latched into row address latch 501. The row address bits are then processed as discussed above using LRR address latch 502 and bit compare circuitry 503 of the selected bank.

Column addresses are latched into column address latch 502 on a falling edge of SYSCLK during a read command or write command as appropriate to the operation to be performed. Data is then output through the data latches 413 and data bus 414 connected thereto, starting at the initial column address, after the lapse of a latency period. For a write operation, the latency period is predetermined. For a read operation, the latency period may be a predetermined value, or may be extended by a preselected amount, as discussed in conjunction with FIG. 8. If a plurality of banks have been selected for the access, a bank switch is made once the data is SRAM registers 603a and 603b of the initial bank have been paged out. The paging from the next bank in the loop starts from the initial address latched in the column address latches 502.

The timing of memory operation illustrated in FIG. 9 does not take advantage of nonmultiplexed address bus 410. Therefore, the timing of memory operations illustrated in FIG. 10 is to be preferred. Row and column addresses are simultaneously presented by the memory controller (not shown in FIG. 6) on address bus 410 during the assertion of a read command or write command, as appropriate, in command register 406, and are latched on the falling edge of SYSCLK into row address latch 501, and column address latch 502, respectively. Following a latency period as discussed hereinabove, data are read or written as appropriate to the operation signalled in command register 406. Again, data are accessed by words starting at the location corresponding to the received column address from SRAM register 1 of the initial bank and continuing through the locations of SRAM register 2. At the conclusion of the write to SRAM register 2, the write switches to register 1 of the next bank in the loop, starting with the location corresponding to the column address latched in that banks column address latch 502.

As discussed above, data loaded into the SRAM registers can be accessed in a number of different ways, including non-contiguous accessing within a bank, between banks, or both. For example, consider the case where Bank 0 registers 603a and 603b are respectively accessed with Addr0 and Addr4, the SRAM registers of Bank 1 with addresses Addr1 and Addr5, the SRAM registers of Bank 2 with addresses Addr2 and Addr6, and the Bank 3 data at addresses Addr3 and Addr7. This type of access can be implemented as follows.

During a first memory cycle, a row address is received on the address bus, and latched as previously described. On the falling edge of SYSCLK the row addresses are latched in the row address latches 501 of all the banks. Bank selection is determined by the bank select bits in the row address, in an embodiment of a multiprocessing system such as multiprocessing system 200A. Alternatively, bank selection is automatic in an embodiment in which the full address space spanned by each bank is unique, such as in multiprocessing system 200B. For the selected bank, comparison circuitry 504 compares the incoming row address, less any bank select bits, with the LRR row address stored in each of the plurality of LRR latches 604 for the selected bank.

Assume that Bank 0 is the bank being accessed and that a match occurs between the incoming row address, less any bank select bits, (Addr) and the bits stored in LRR latch 1. After the latency period elapses, SRAM register 1 of Bank 0 is accessed. For Bank 0, the address row address register is incremented to produce address Addr+4. This new address is used to access Bank 0 DRAM array 407. At the same time, the incoming address in row latch 502 of Bank 1 is incremented to Addr+5, in the Bank 2 row address latch to Addr+6 and in the Bank 3 row address latch to Addr+7.

It should be noted that if the incoming row addresses, less any bank select bits, instead match with the bits in an LRR Latch 2 (603b) of Bank 0, then the Bank 0 SRAM register 2 (603b) is accessed and the contents of the row address registers are incremented in all banks to load SRAM registers 1 for all banks. In this example, the incoming row address latched in Bank 0 would be decremented to Addr−4, in Bank 1 to Addr−3, in Bank to Addr−2 and Bank 3 to Addr−1. SRAM registers 1 would the be loaded from DRAM in accordance to the modified addresses.

At the start of the second memory cycle, the contents of row address registers 502 for all banks are copied to the LRR latches corresponding to the set of SRAM registers which were loaded during the first memory cycle. For example, if SRAM registers 2 (603b) were loaded during the first cycle, the modified contents of row address latches are transferred to the associated LRR latches (604b).

Then in the second memory cycle, the addresses could be modified as follows for purposes of loading SRAM registers 1. If Bank 0 is the accessed bank, the contents of its row address latches are decremented to the original input address Addr. Similarly the addresses in the Banks 1, 2 and 3 are respectively modified to become Addr+1, Addr+2 and Addr+3.

Continuing with the example above where the first memory cycle loaded SRAM registers 1, with Bank 0 being the accessed bank, accessing SRAM, registers 2 in the second cycle may be performed by the following address operations: the modified row address in the Bank 0 row address latch is decremented back to Addr, in Bank 1 to Addr+1, in Bank 2 to Addr+2, and Bank 3 to Addr+3. These twice-modified addresses are used to load SRAM registers 2 from DRAM and at the start of the following memory cycle are loaded into the corresponding LRR latches 2.

The procedure is the same no matter which bank is accessed through its data latch (thereby determining the address modification sequence) and no matter how the row addresses are modified. In sum, numerous sequences and address modifications are possible, as required to access a predetermined block of data, with a given spatial and/or temporal coherency, in the SRAM registers.

When no match occurs between the received row address, less any bank select bits, and any of the row addresses stored in SRAM registers 603 and the selected bank, the accessing procedure changes. In this case, no SRAM registers 603 are accessed via the data latches and all SRAM registers 603 (if desired) are loaded from DRAM.

During the first memory cycle, the received row address is latched in and then used to transfer data from the DRAM array 407 of the bank being accessed to a selected one of the plurality of SRAM registers 603. The choice of which SRAM register 603 to be loaded can be a function of anyone of a number of factors. For example, it may be the encoding of the address bits themselves (e.g. odd parity sends the data to one register and even parity to another register) or to obtain specific temporal locality (e.g. the register which has not be reloaded in the immediately previous cycle or cycles). At the same time, the received row address, less any bank select bits, are modified in the address latches 501 of the remaining banks, as desired to define the first half of a block of data to be stored in SRAM. Preferably these registers correspond to the SRAM register selected in the accessed bank (i.e. if register 1 is loaded in the accessed bank, register 1 is loaded in the remaining banks). The SRAM registers 603 of these banks are subsequently loaded using the modified addresses.

At the start of the second memory cycle, the contents of the row address latches 501 are copied to the LRR latches 604 corresponding to the SRAM registers 603 accessed during the first memory cycle. Row address increment/decrement circuitry 507 then modifies the addresses in row address latches 501 as required to access a block of data within DRAM and transfer that block of data into the remaining registers of SRAM cache. The SRAM registers 603 not loaded during the first memory cycle are loaded during this cycle, in accordance with the new addresses stored in row address latches 501. At the start of the subsequent memory cycle, these addresses will be copied to the appropriate LRR latches 604, depending on the SRAM registers loaded.

Although the invention has been described with reference to specific embodiments, these descriptions are not meant to be construed in a limiting sense. Various modifications of the disclosed embodiments as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. In a multiprocessor processing system, a memory system comprising:
   a controller for linking at least two processing units to a memory; and
   an integrated memory coupled to said controller, said integrated memory having a plurality of banks, each having a plurality of static random access cell arrays and a dynamic random access cell array coupled to said SRAM, and a data port for coupling said plurality of banks to said controller each of said banks further comprising:
   a plurality of sets of latches each for storing address bits associated with data stored in a corresponding one of said static random access cell arrays; and
   bit comparison circuitry for comparing an address bit received from said controller with an address bit stored in each of said plurality of sets of latches, and enabling access to a selected one of said static random access cell arrays corresponding to a said set of latches storing an address bit matching said received address bits.

2. The memory system of claim 1, wherein each said bank further comprises circuitry for selectively exchanging data between said dynamic random access array to a selected one of said static random access memory arrays.

3. The memory system of claim 1, wherein each said bank further comprises column decoder circuitry including a plurality of column decoders, each said column decoder for accessing a corresponding one of said static random access cell arrays.

4. The memory system of claim 1, wherein each of said plurality of banks comprise:
   a row address latch for storing received address bits; and
   circuitry for modifying address bits stored in said address latch to produce second address bits.

5. The memory system of claim 2, wherein said plurality of latches further comprises a plurality of data latches a predetermined number of which are associated with each of said plurality of banks, and coupled to said controller via a data port in said associated bank.

6. In a multiprocessor data processing system, a memory system comprising:
   a memory controller for linking at least two processing devices to a memory; and
   an integrated memory coupled to said memory controller, said integrated memory comprising a plurality of memory banks, each of said plurality of memory banks having a plurality of static cell arrays, a dynamic cell array coupled to said static cell arrays and wherein address bits for accessing said dynamic and static cell arrays of each of said banks associated with each memory bank span an address space of said integrated memory wherein each said bank further comprises:
   a plurality of sets of latches each for storing address bits associated with data stored in a corresponding one of said static cell arrays; and
   bit comparison circuitry for comparing an address bit received from said memory controller with an address bit stored in each of said plurality of sets of latches, and enabling access to a selected one of said static cell arrays corresponding to a said set of latches storing an address bit matching said received address bits.

7. The memory system of claim 7, wherein each said bank further comprises circuitry for selectively exchanging data between said dynamic array to a selected one of said static memory arrays.

8. The memory system of claim 6, wherein each said bank further comprises column decoder circuitry including a plurality of column decoders, each said column decoder for accessing a corresponding one of said static random access cell arrays.

9. The memory system of claim 6, wherein each said bank further comprises:
   a row address latch for storing received address bits associated with data stored in a corresponding one of said static cell arrays; and
   circuitry for modifying address bits stored in said address latch to produce second address bits.

10. The memory system of claim 6 further comprises a plurality of data latches coupled to said dynamic cell array and said static cell arrays said plurality of data latches being coupled to said memory controller via a data port.

11. In a multiprocessor data processing system, a memory system comprising:
    a memory controller for linking at least two central processing units (CPU) to a memory;
    a plurality of integrated memories each having a dynamic memory array and static random access memory cell array cache, each of the plurality of integrated memories comprising:
    a plurality of sets of latches each for storing address bits associated with data stored in a corresponding one of said static random access cell arrays; and
    bit comparison circuitry for comparing an address bit received from said memory controller with an address bit stored in each of said plurality of sets of latches, and enabling access to a selected one of said static random access cell arrays corresponding to a said set of latches storing an address bit matching said received address bits.

12. The memory system of claim 11, wherein each integrated memory occupies an independent memory space.

13. The memory system of claim 11, wherein said memory controller links said at least two CPUs and said plurality of integrated memories in crossbar switch fashion.

14. The memory system of claim 11, wherein each integrated memory comprises:
   a plurality of static random access (SRAM) cell arrays, and a plurality of dynamic random access (DRAM) cell arrays coupled to said SRAM; and
   a plurality of data latches coupled to said DRAM and said SRAM, said plurality of data latches being coupled to said memory controller via a data port.

15. The memory system of claim 11, wherein each integrated memory further comprises:
   circuitry for selectively exchanging data between said dynamic random access array to a selected one of said static random access memory arrays.

16. The memory system of claim 11, wherein each integrated memory further comprises column decoder circuitry including a plurality of column decoders, each said column decoder for accessing a corresponding one of said static random access cell arrays.

17. The memory system of claim 11, wherein each integrated memory further comprises:
   a row address latch for storing received address bits associated with data stored in a corresponding one of said SRAM cell arrays; and
   circuitry for modifying address bits stored in said address latch to produce second address bits.

18. The memory system of claim 11, wherein each integrated memory further a plurality of memory banks.

19. The memory system of claim 18, wherein each memory bank further comprises:
   a plurality of static random access (SRAM) cell arrays, and a plurality of dynamic random access (DRAM) cell arrays coupled to said SRAM; and
   a plurality of data latches coupled to said DRAM and said SRAM, said plurality of data latches being coupled to said memory controller via a data port.

20. The memory system of claim 19, wherein said plurality of data latches further comprises a plurality of data latches a predetermined number of which are associated with each of said plurality of memory banks, and coupled to said memory controller via a data port in said associated memory bank.

21. An integrated circuit comprising:
   at least one central processing unit (CPU);
   a controller for linking said at least one central processing unit to a memory; and
   an integrated memory coupled to said controller, said integrated memory having a plurality of banks, each having a plurality of static random access cell arrays and a dynamic random access cell array coupled to said SRAM, and a data port for coupling said plurality of banks to said controller, each of said plurality of banks comprising:
      a plurality of sets of latches each for storing address bits associated with data stored in a corresponding one of said static random access cell arrays; and
      bit comparison circuitry for comparing an address bit received from said controller with an address bit stored in each of said plurality of sets of latches, and enabling access to a selected one of said static cell random access arrays corresponding to a said set of latches storing an address bit matching said received address bits.

* * * * *